(12) United States Patent
Plata (10) Patent No.: US 7,637,254 B2
(45) Date of Patent: Dec. 29, 2009

(54) SYSTEM AND METHOD FOR PREPARING AN OPTIMIZED FUEL MIXTURE

(75) Inventor: Carlos A. Plata, Bogota (CO)

(73) Assignee: Megaion Research Corporation (PA)

( * ) Notice: Subject to any disclaimer, the term of this patent is extended or adjusted under 35 U.S.C. 154(b) by 207 days.

(21) Appl. No.: 11/785,572

(22) Filed: Apr. 18, 2007

(65) Prior Publication Data

US 2008/0072882 A1    Mar. 27, 2008

Related U.S. Application Data

(60) Provisional application No. 60/792,616, filed on Apr. 18, 2006.

(51) Int. Cl.
*B01J 19/08* (2006.01)

(52) U.S. Cl. ...................................... 123/538

(58) Field of Classification Search ......... 123/536–539, 123/543–557
See application file for complete search history.

(56) References Cited

U.S. PATENT DOCUMENTS

| | | | | |
|---|---|---|---|---|
| 2,324,392 A | * | 7/1943 | Hinchman | 48/180.1 |
| 4,434,771 A | * | 3/1984 | Slomnicki | 123/539 |
| 4,519,357 A | * | 5/1985 | McAllister | 123/539 |
| 6,463,917 B1 | * | 10/2002 | Silver | 123/536 |
| 6,990,965 B2 | * | 1/2006 | Varasundharosoth et al. | 123/539 |
| 7,341,049 B2 | * | 3/2008 | Clack | 123/539 |
| 2005/0016507 A1 | * | 1/2005 | Tamol | 123/538 |
| 2005/0147546 A1 | * | 7/2005 | Long | 422/186.07 |

FOREIGN PATENT DOCUMENTS

| | | |
|---|---|---|
| DE | 1258658 | 1/1968 |
| EP | 1146220 A1 | 10/2001 |
| FR | 2288870 | 5/1976 |
| GB | 512211 | 8/1939 |
| GB | 687947 | 2/1953 |
| GB | 714015 | 8/1954 |
| GB | 2084244 | 4/1982 |
| JP | 2002309941 | 10/2002 |

OTHER PUBLICATIONS

Int'l Search Report received in corresponding Int'l Application No. PCT/IB2007/003327.

* cited by examiner

*Primary Examiner*—M. McMahon
(74) *Attorney, Agent, or Firm*—Hogan & Hartson, LLP (57) ABSTRACT

The invention provides for a system and method for creating an optimized fuel/air mixture for more efficient combustion. The system in accordance with the invention includes an ozone generator and a gasifier that receives liquid fuel and ozone and creates an optimized fuel of mixture. The optimized fuel/air mixture is then delivered to the cylinders of a combustion engine.

13 Claims, 6 Drawing Sheets

SYSTEM AND METHOD FOR PREPARING AN OPTIMIZED FUEL MIXTURE

CROSS-REFERENCE TO RELATED APPLICATION

The application claims priority under 35 U.S.C. 119(e) from the U.S. Provisional Application Nos. 60/792,616, filed on Apr. 18, 2006, which is incorporated herein by reference.

BACKGROUND OF THE INVENTION

1. Field of the Invention

The invention relates to a system and method for preparing an optimized fuel mixture, and more particularly, to a system and method for producing ozone and gaseous fuel and blending same in a manner to produce an optimized fuel mixture for more efficient combustion.

2. Description of the Related Art

Conventional internal combustion engines rely upon a process for creating a mixture of ambient air and fuel. This convention air/fuel mixture is fed into the cylinder of the internal combustion engine where it is ignited so as to drive a piston in an upwards motion. This process is repeated so that the piston is in continuous motion between an upwards and downwards position, thus driving the engine.

Conventional internal combustion engines are notoriously inefficient and polluting. Thus, efforts have been made in the past to attempt improve engine performance. However, any improvements in engine efficiency to date have been minimal. Thus, there is a need for systems and methods that will significantly improve the performance of internal combustion engines.

SUMMARY OF THE INVENTION

The invention provides a system and method for preparing an optimized fuel mixture that significantly improves the performance of internal combustion engines. In accordance with embodiments of the invention, ambient air is processed so as to produce ozone and this ozone is introduced into the fuel gasification process resulting in an optimized fuel mixture that can be fed into the cylinders of an internal combustion engine. The optimized fuel mix in accordance with the invention detonates in the cylinder more completely and efficiently than conventional air/fuel mixtures. Thus, fuel is more efficiently used. In fact, the system in accordance with the invention reduces the emissions of contaminating agents, toxic gases, such as carbon monoxide (CO), and hydrocarbons, such as non-burnt gasoline (HC), while also reducing fuel consumption by about 50%. In addition, the system in accordance with the invention allows for increased engine life because lower volumes of hydrocarbons are burnt more efficiently, minimizing the residual carbon if the engine is properly maintained.

Thus, the invention provides a system for optimizing a fuel mixture that includes an ozone generator and a fuel gasifier that receives both ozone and liquid fuel for gasification. The ozone generator takes ambient air and converts it to ozone. The ozone generator may include an inverter, a coil and a set of insulated meshes. The gasifier may include a gas combustion chamber, an injector and a pre-heater, along with a port for receiving ozone. The gasified fuel is then introduced into the internal combustion engine and can be introduced at a rate so as to optimize combustion.

The invention also provides a method for preparing an optimized fuel mix that includes the steps of receiving ambient air and producing ozone from the ambient air, receiving gaseous fuel, introducing the ozone into the liquid fuel and gasifying the liquid fuel.

Through the system and method described above, the invention allows for the preparation of an optimized fuel mixture that significantly improves the performance of internal combustion engines. The invention is applicable for any type of internal combustion engine, including, for example, diesel motors and/or aircraft turbines.

BRIEF DESCRIPTION OF THE DRAWINGS

The accompanying drawings, which are included to provide a further understanding of the invention and are incorporated in and constitute a part of this specification, illustrate embodiments of the invention. Together with the written description, these drawings serve to explain the principles of the invention. In the drawings.

DETAILED DESCRIPTION OF THE PREFERRED EMBODIMENTS

Figure 1:
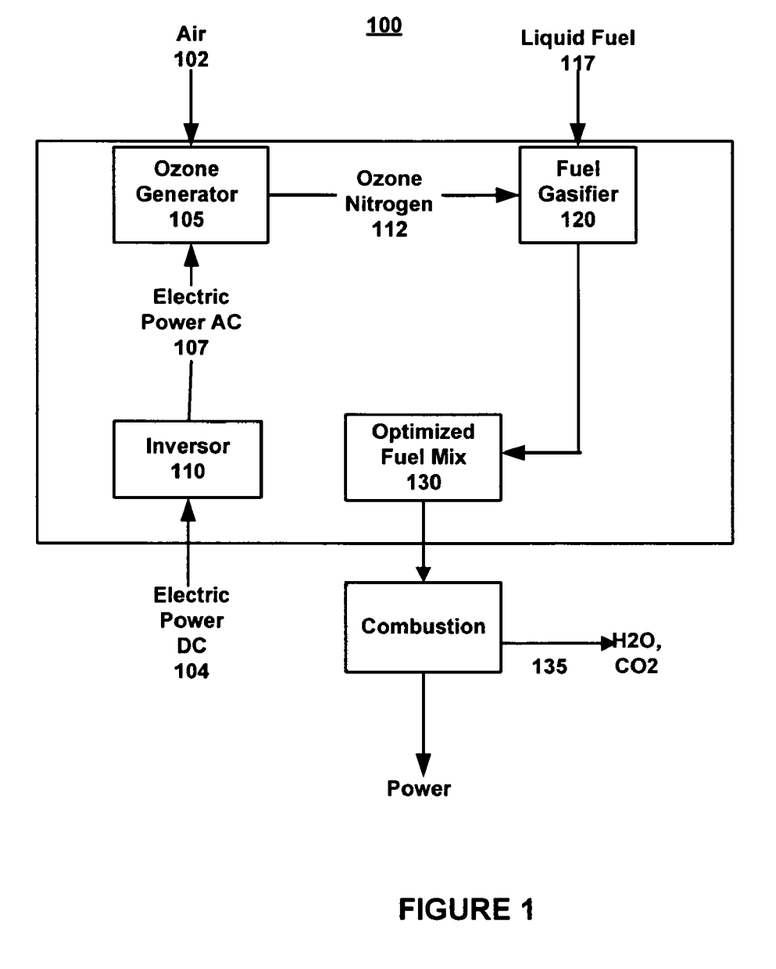
FIG. 1 illustrates a block diagram of a system for preparing an optimized fuel mixture in accordance with an embodiment of the invention.

FIG. 1 shows a block diagram of a system 100 for optimizing a fuel combustion mix in accordance with the invention. FIG. 1 shows an ozone generator 105. The ozone generator 105 receives ambient air 102 from an intake (not shown in FIG. 1). As shown in FIG. 1, the ozone generator 105 includes an inversor 110 which receives DC current 104 and converts it to AC current 107 for use by the ozone generator 105. The operation of the ozone generator 105 is described in greater detail below in conjunction with FIG. 4 however, in general, the ozone generator 105 processes the ambient air 102 so as to yield ozone 112 (and/or an ozone nitrogen mixture). The ozone 112 is then fed into a fuel gasifier 120 also shown in FIG. 1.

The fuel gasifier 120 receives liquid fuel 117, such as gasoline or any other combustible liquid fuel. The gasifier 120 also receives the ozone 112 generated by the ozone generator 105. The gasifier 120 is described in greater detail below in conjunction with FIG. 2. In general, the gasifier 120 turns the liquid fuel 117 into an optimized fuel mix (gasified fuel) 130 by heating the ozone 112 and the liquid fuel 117. The optimized fuel mix 130 is then delivered to an internal combustion engine 135 to generate power to drive an engine's pistons. Gaseous $CO_2$ and $H_2O$ are also by products of the internal combustion engine. The optimized fuel mixture 130 allows an internal combustion engine 135 to operate more efficiently and with fewer emissions than convention internal combustion engine systems.

Figure 2:
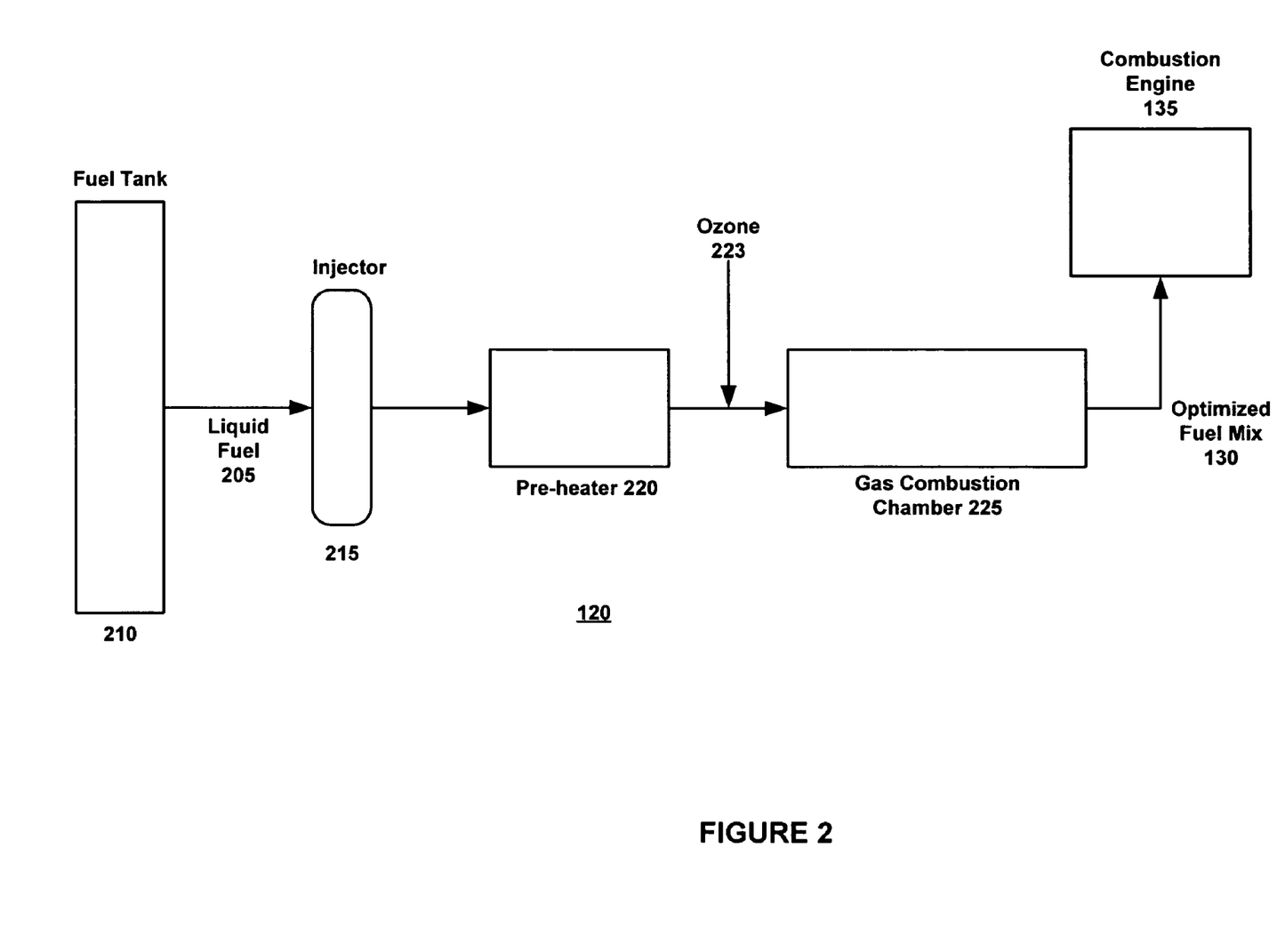
FIG. 2 illustrates a fuel gasifier in accordance with an embodiment of the invention in greater detail.

FIG. 2 shows the fuel gasifier 120 in accordance with one embodiment of the invention in greater detail. FIG. 2 shows a fuel tank 210 that contains liquid fuel 205. The liquid fuel 205 first enters an injector 215 which injects the liquid fuel 205 into a pre-heater 220. The pre-heater 220 is activated to preheat the liquid fuel 205 before the it is delivered to a gas combustion chamber 225. Ozone 223 from the ozone generator 105 (shown in FIG. 1) is also introduced into the gas combustion chamber 225. The gas combustion chamber 225 is heated so it reaches a temperature required to change the state of the fuel 205 from liquid to gas. The gas combustion chamber 225 receives the ozone 223 and the fuel 205 which is still in a liquid state after having passed from the vehicle's fuel tank 210, through the injector 215 and through the preheater 220. The elevated temperature of the gas combustion chamber 225 gasifies the fuel. The combination of the ozone 223 and the heated fuel results in a complete burning of the fuel. The optimized fuel mix 130 is then delivered to the internal combustion engine 135.

Figure 3:
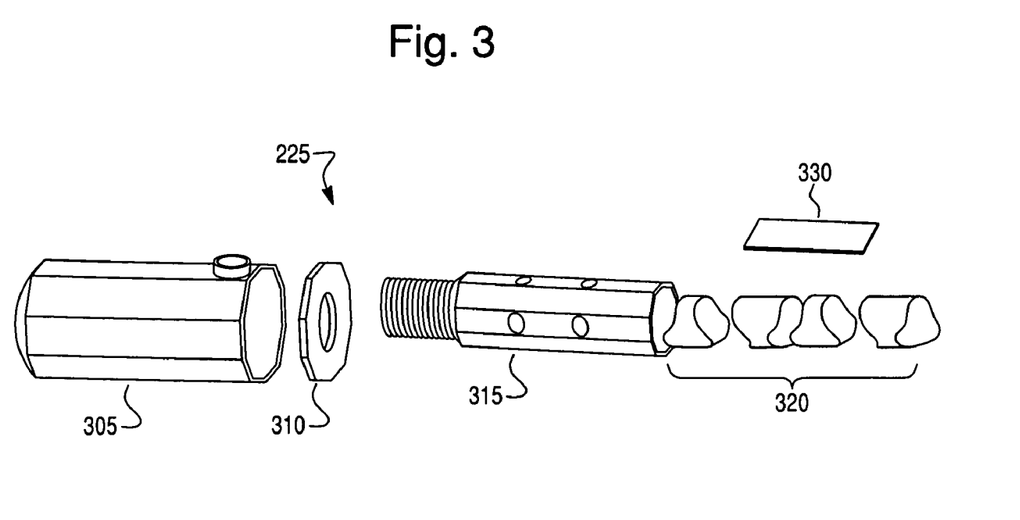
FIG. 3 illustrates a gas combustion chamber in accordance with the invention in greater detail.

FIG. 3 illustrates the components of the gas combustion chamber 225 of FIG. 2 in greater detail in accordance with one embodiment of the invention. As shown in FIG. 3, the gas combustion chamber 225 includes a chamber cap 305 that covers and seals a combustion chamber 315. A washer 310 assists the coupling of the chamber cap 305 and the combustion chamber 315. FIG. 3 also shows flaps 320 coupled to the combustion chamber 315 and a plate 320 in contact with the flaps 320. The flaps 320 act as a preheater that accelerate the gasified air/fuel mixture. In one embodiment of the invention, the combustion chamber 315 is in close proximity to a spark plug. The spark from the spark plug initiates the combustion process between liquid fuel and ozone which are introduced into the combustion chamber 315.

Figure 4:
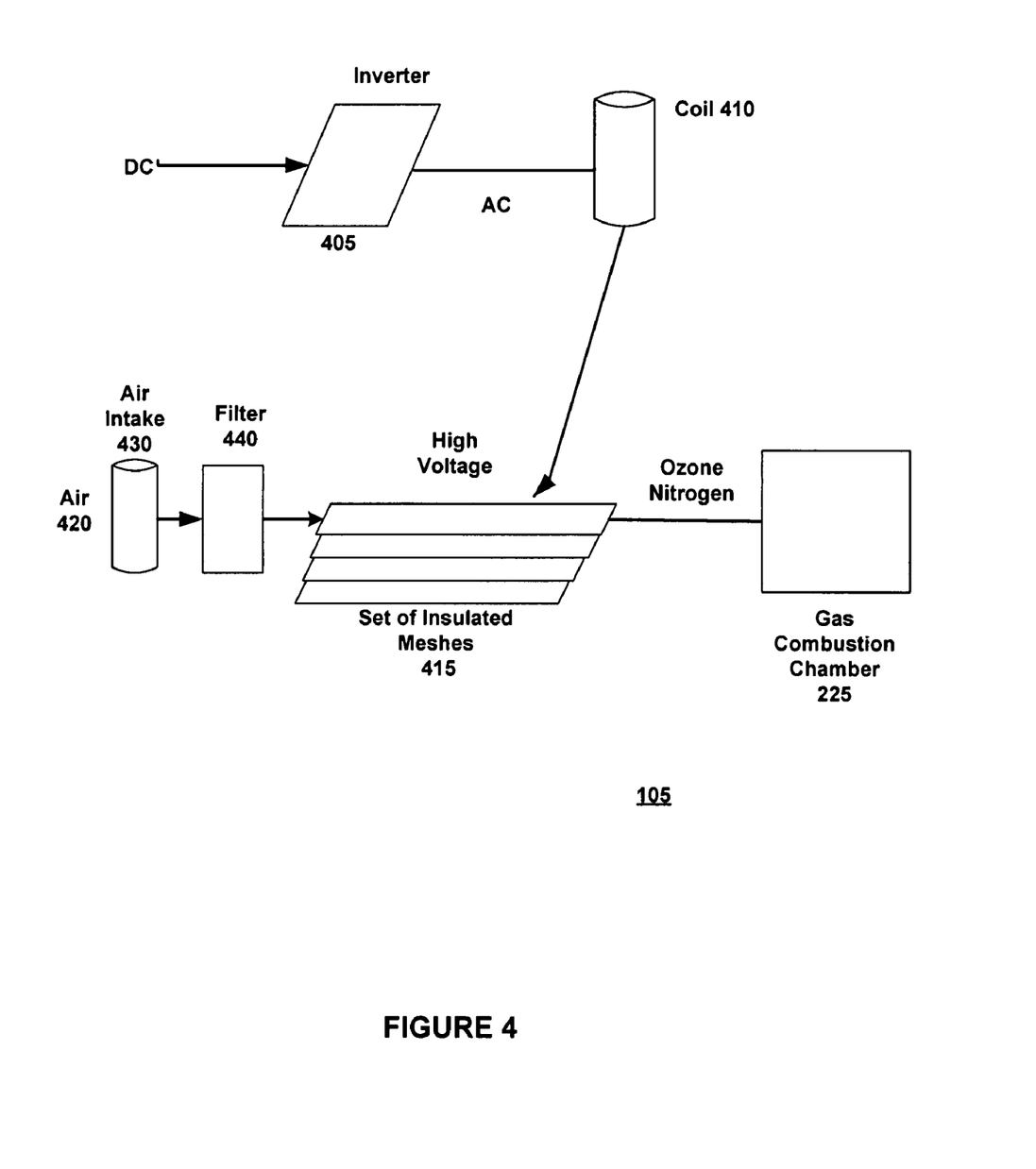
FIG. 4 illustrates an ozone generator in accordance with an embodiment of the invention in greater detail.

FIG. 4 illustrates the ozone generator 105 in greater detail. As shown in FIG. 4, the ozone generator 105 includes an electrical inverter 405 that converts a vehicle's direct current (DC) into alternate current (AC), a coil 410 that converts low voltage current into high voltage current (3,000 to 12,000 volts), and a set of stainless steel meshes 415 that receive the high voltage current that are separated by plates of glass insulators.

In operation, the ozone generator 105 receives ambient air 420 from an air intake unit 430. The ambient air 420 may be sent through an air filter 440 prior to delivery to the ozone generator 105. The ambient air 420 is then flowed over the insulated meshes 415. A high voltage current from the coil 410 is applied to the insulated meshes 415. Ozone and nitrogen are produced when the air passes through the set of meshes and glass plates 415. A high voltage electrical discharge is produced between positive and negative electrodes that are separated by the glass plates 415. This discharge modifies the molecular structure of the air and produces ozone that is then delivered to gas combustion chamber 225 (also shown in FIGS. 2 and 3) where it is combined with liquid fuel for gasification.

Figure 5:
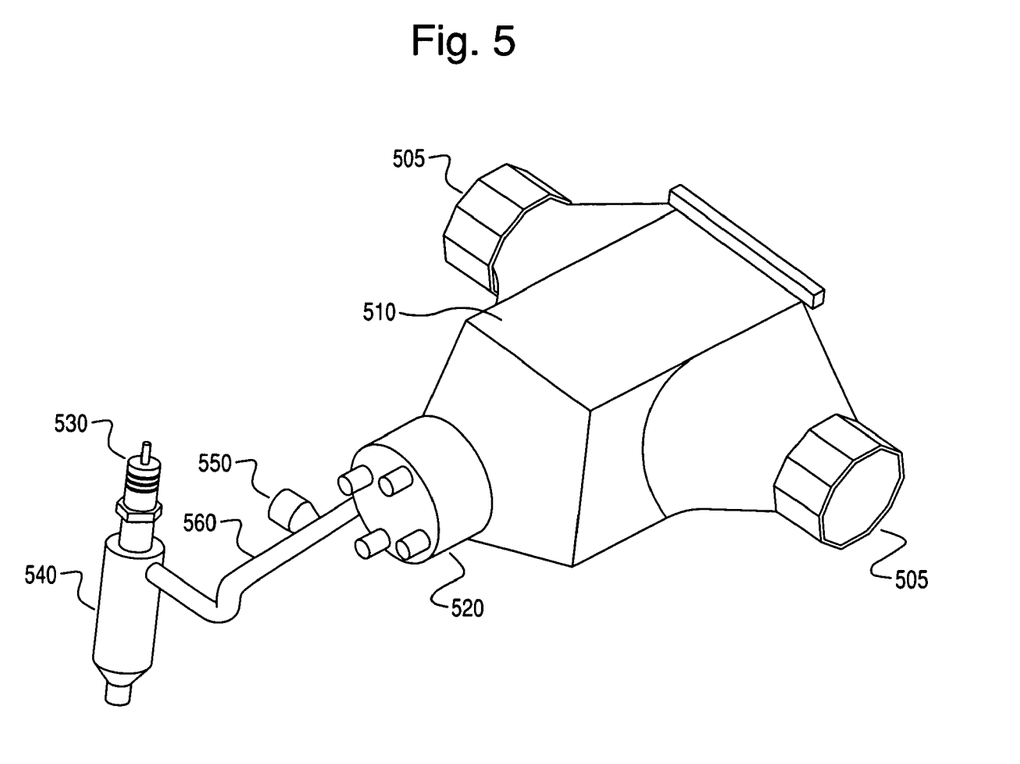
FIG. 5 illustrates a combination of the ozone generator and gasifier in accordance with an embodiment of the invention.

FIG. 5 illustrates the ozone generator 105 and fuel gasifier 120 combination. FIG. 5 shows air inlets 505 for receiving ambient air. The ambient air flows into an ozone generator 510. The ozone generator 510 includes all of the components of the ozone generator 105 shown in FIG. 4. Ozone then flows through a hose port 520 and through a pipe 560 into a combustion chamber 540 which is similar to the combustion chamber 225 of FIG. 2. An injector coupling 550 injects fuel into the combustion chamber 540 via the pipe 560. A spark plug 530 is located in close proximity to the combustion chamber 540 and sparks generated by the spark plug 530 initiate combustion of the gasified fuel and ozone mixture resulting in a more complete combustion process.

Figure 6:
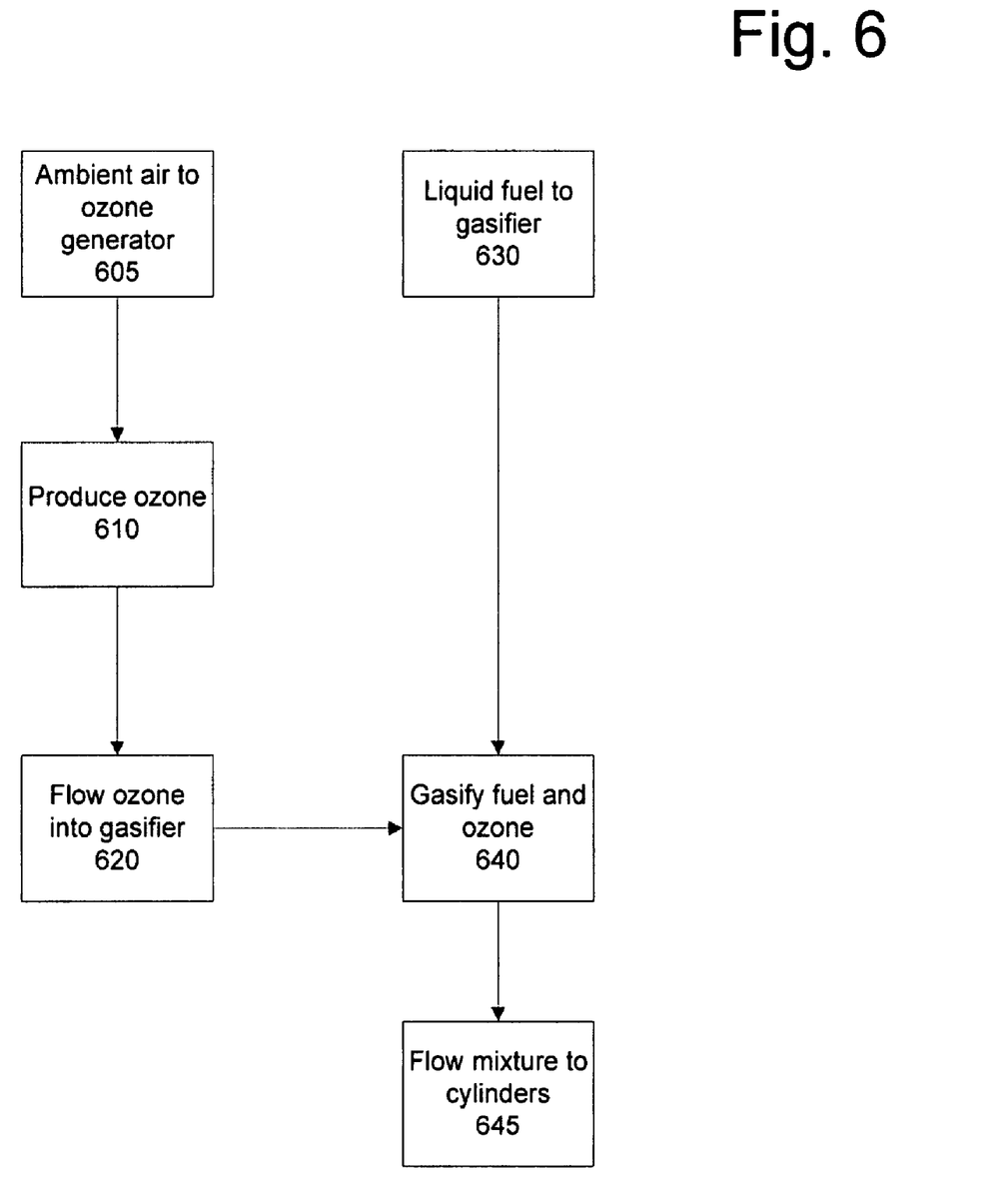
FIG. 6 illustrates a process for preparing an optimized fuel mixture in accordance with an embodiment of the invention.

FIG. 6 illustrates the process for preparing an optimized combustion mix in accordance with the invention. The process begins with step S605 whereby ambient air is fed into an ozone generator device. The process then moves to step S610. In step S610, the ambient air is converted to ozone. The process then goes to step S620 where the ozone is fed into a combustion chamber.

Step S630, which may be in parallel with step S605, involves delivering liquid fuel into the gasifier. In step S640, the fuel is gasified in the combustion chamber into which ozone has also been introduced. The process then moves to step S645 where the air/fuel mixture is introduced into the cylinders of the engine.

The following tests were conducted to provide data regarding the optimized fuel mix in accordance with the invention:

Activities Performed:
  A BMW 635 automobile model 1979 with 3,500 cubic centimeters was selected to perform the initial tests (see photographs in Attachment 1).
  Modifications were made on the automobile in order to install the injector, the pre-heater and the fuel gasifier.
  An electrical inverter and a coil to generate a high voltage current were fabricated, installed on the vehicle and connected to the insulated meshes.
  The conventional flow of air was modified to install the set of insulated meshes in its course, to allow the generation of ozone.
  A blender and dose regulator was designed, fabricated and installed prior to the entrance of the new fuel mix to the motor cylinders.
  The motor controls were modified to allow operation of the motor without the system in accordance with the invention, that is, in a conventional manner, and to allow operation of the motor with the system in accordance with the invention.

Fuel Consumption Tests:
  The following specific tests were performed to measure fuel consumption of the motor.
  Two test injectors were installed beside the motor: one identical to the six injectors of the vehicle (Bosch Part No. 0-280-150-152) and one identical to the injector of the system in accordance with the invention (HMC 35310-22010).
  The system in accordance with the invention was calibrated to run the motor at 1,100 RPM. Once this was achieved, the injector's frequency (kilohertz) was measured and a value of 0.060 was obtained. Then the motor was turned off and the injector of the system in accordance with the invention was disconnected and the system test injector was connected to operate at the same 0.060 kilohertz. The motor was then turned on to operate at 1,100 RPM. One of the six injectors was disconnected from the motor and the test injector connected to the motor. Again, the injectors' frequencies were checked and in both cases average values of 0.015 or 0.016 kilohertz were obtained.
  Fuel consumption was measured by running the motor at approximately 1,100 RPM during 4 minutes with both test injectors connected simultaneously. During this test the system in accordance with the invention is not running the motor, but it is turned on so that the test injector is operating at the same frequency that the system injector operates when running the motor at 1,100 RPM. Obviously, the motor's test injector operates at the same frequency of the other five injectors that are running the motor.
  After operating the test injectors for four minutes, both are simultaneously disconnected and the volume of liquid fuel that each one has injected in the test tube is measured. The volume of the motor's test injector has to be multiplied by six in order to compare it with the volume of the test injector in accordance with the invention.

Fuel consumption was also measured by running the motor at 1,100 RPM during 4 minutes with only one of the test injectors connected.

The following table presents the data of fuel consumption measured for all of the tests performed. It can be appreciated that on average the system in accordance with the invention reduces fuel consumption by 56%.

| | | | | Volume of Test Injector (ml) | | Total Volume (ml) | |
|---|---|---|---|---|---|---|---|
| Test No. | Date | RPM | Duration | BMW | Invention | BMW | Invention |
| | | | Simultaneous Measures | | | | |
| 1 | Mar. 9, 2006 | 1,100 | 4' 09" | 22 | 60 | 132 | 60 |
| 2 | Mar. 9, 2006 | 1,100 | 4' 09" | 21.5 | 63 | 129 | 63 |
| 3 | Mar. 9, 2006 | 1,100 | 4' 09" | 23.5 | 61 | 141 | 61 |
| 4 | Mar. 10, 2006 | 900 | 4' | 23 | 59 | 138 | 59 |
| 5 | Mar. 10, 2006 | 1,100 | 4' | 22 | 59 | 132 | 59 |
| 6 | Mar. 10, 2006 | 1,100 | 4' | 22 | 59 | 132 | 59 |
| 7 | Mar. 10, 2006 | 1,100 | 4' | 22.5 | 59 | 135 | 59 |
| 8 | Mar. 10, 2006 | 1,150 | 4' | 23 | 60 | 138 | 60 |
| 9 | Mar. 10, 2006 | 1,150 | 2' | 11.5 | 30 | 69 | 30 |
| 10 | Mar. 10, 2006 | 1,150 | 2' | 12 | 31 | 72 | 31 |
| | | | Independent Measures | | | | |
| 1 | Mar. 9, 2006 | 1,200 | 4' 09" | 23 | | 138 | |
| 2 | Mar. 9, 2006 | 1,200 | 4' 09" | | 62 | | 62 |
| 3 | Mar. 10, 2006 | 1,200 | 4' | 22.5 | | 135 | |
| 4 | Mar. 10, 2006 | 1,200 | 4' | | 58.5 | | 58.5 |
| 5 | Mar. 10, 2006 | 1,150 | 4' | 23.5 | | 141 | |
| 6 | Mar. 10, 2006 | 1,150 | 4' | | 60.5 | | 60.5 |
| | Total Measures | | | | ml | 1,632 | 722 |
| | | | | | % | 100% | 44% |

Analysis of Gas Emissions:

The following results were obtained in the analysis of gas emissions performed in a service center to the vehicle operating with the conventional system (BMW) and with the system in accordance with the invention operating with and without the ozone generator.

| | GAS ANALYSIS | | | | | |
|---|---|---|---|---|---|---|
| Test No. | System Tested | Date | HC (ppm) | CO (%) | CO2 (%) | O2 (%) |
| 1 | BMW | Mar. 21, 2006 | 238 | 5.61 | 9.7 | 1.57 |
| 2 | System with Ozone Generation | Mar. 21, 2006 | 196 | 3.49 | 11.3 | 1.49 |
| 3 | System without Ozone Generation | Mar. 21, 2006 | 198 | 4.91 | 10.3 | 1.40 |

The results indicate that the system in accordance with the invention reduces emission of hydrocarbons (HC) by 18% and emissions of carbon monoxide (CO) by 38% when operated with the ozone generator. When operated without the ozone generator the emission of hydrocarbons is reduced by 17% and the emission of carbon monoxide is reduced by 12%.

The foregoing description of the preferred embodiments of the invention has been presented for the purposes of illustration and description. It is not intended to be exhaustive or to limit the invention to the precise form disclosed. Many modifications and variations are possible in light of the above teaching.

The invention claimed is:

1. A system for generating and igniting a combination of gasified fuel and ozone gas and delivering the combination of gasified fuel and ozone gas into an internal combustion engine, said system comprising:
   a. an ozone generator for processing ambient air to generate ozone gas; and
   b. a fuel gasifier structured to receive liquid fuel from a fuel tank and ozone gas from the ozone generator, and to transmit a pre-ignited fuel mixture of gasified fuel and ozone gas to the internal combustion engine, said gasifier containing:
      i. a preheater for preheating the liquid fuel;
      ii. an injector for injecting the liquid fuel into the preheater;
      iii. a gas combustion chamber which is heated to a temperature high enough to change the liquid fuel into gasified fuel, said chamber comprising at least one spark plug for igniting a combination of the ozone gas and the gasified fuel to generate the pre-ignited fuel mixture of gasified fuel and ozone gas.

2. The system of claim 1 wherein the ozone generator comprises:
   a. an electrical circuit for converting a vehicle's direct current into alternate current;
   b. a coil for converting low voltage current into high voltage current;
   c. a set of meshes that receive the high voltage current from the coil; said meshes capable of producing a discharge that can modify the molecular structure of the ambient air thereby producing ozone gas; and
   d. an insulator which separates the meshes.

3. The system of claim 1 comprising the internal combustion engine, wherein the internal combustion engine receives the combination of ozone gas and gasified fuel which was ignited by the spark plug of the gas combustion chamber.

4. The system of claim 1 wherein the preheater contains flaps coupled to the combustion chamber for preheating the fuel mixture.

5. The system of claim 1 wherein the gas combustion chamber contains a chamber cap for covering and sealing the combustion chamber.

6. The gas combustion chamber of claim 1 comprising a washer for assisting the coupling of the chamber cap and the combustion chamber, and a plate in contact with the flaps.

7. The system of claim 2 wherein the insulator is composed of a plate of glass.

8. The system of claim 2 wherein there are a plurality of insulators which are composed of plates of glass.

9. A system for generating and igniting a combination of gasified fuel and ozone gas and delivering the combination of gasified fuel and ozone gas into an internal combustion engine, said system comprising:
   a. an ozone generator for processing ambient air to generate ozone gas;
   b. a fuel gasifier comprising:
      i. a receiving means to receive liquid fuel from a fuel tank and ozone gas from the ozone generator;
      ii. a transmission means to transmit a pre-ignited mixture of gasified fuel and ozone gas to the internal combustion engine;
      iii. a preheater for preheating the liquid fuel;
      iv. an injector for injecting the liquid fuel into the preheater; and
      v. a gas combustion chamber containing a heating means for changing the liquid fuel into gasified fuel, said chamber comprising at least one spark plug for igniting a combination of the ozone gas and the gasified fuel to generate the pre-ignited mixture of gasified fuel and ozone gas.

10. The system of claim 9 wherein the generator comprises:
    a. an electrical circuit for converting a vehicle's direct current into alternate current;
    b. a coil for converting low voltage current into high voltage current;
    c. a set of meshes that receive the high voltage current from the coil; said meshes capable of producing a discharge that can modify the molecular structure of the ambient air thereby producing ozone gas; and
    d. an insulator which separates the meshes.

11. The system of claim 9 comprising the internal combustion engine, wherein the internal combustion engine contains a receiving means for receiving the combination of ozone gas and gasified fuel which was ignited by the spark plug of the gas combustion chamber.

12. A method for generating and igniting a combination of gasified fuel and ozone gas and delivering the combination of gasified fuel and ozone gas into an internal combustion engine, said system comprising:
    a. providing an ozone generator which receives ambient air from an intake;
    b. transforming the ambient air into a gas containing ozone;
    c. feeding the gas into a fuel gasifier;
    d. receiving liquid fuel with the fuel gasifier;
    e. preheating the liquid fuel with a preheater;
    f. receiving the preheated liquid fuel and gas at a gas combustion chamber;
    g. transforming the liquid fuel into an optimized fuel mixture by heating the gas and the liquid fuel;
    h. using a spark plug to ignite the optimized fuel mixture in the combustion chamber thereby forming a pre-ignited optimized fuel mixture; and
    i. delivering the pre-ignited optimized fuel mixture to the internal combustion engine.

13. The method of claim 12 comprises the steps of:
    a. providing a high voltage current from a coil, and applying the current to an insulated mesh; and
    b. receiving DC current and converting the DC current into AC current for use by the ozone generator.

* * * * *